(12) United States Patent
Fujita et al.

(10) Patent No.: US 6,360,251 B1
(45) Date of Patent: Mar. 19, 2002

(54) METHODS, APPARATUS AND COMPUTER PROGRAM PRODUCTS FOR MESSAGE PROCESSING CONTROL INCLUDING SELECTIVE DISPLAY OF USER ADDRESSES ASSOCIATED WITH A GROUP ADDRESS

(75) Inventors: Kiyoshi Fujita; Shinichi Meguro, both of Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/102,292

(22) Filed: Jun. 22, 1998

(30) Foreign Application Priority Data

Jul. 1, 1997 (JP) .............................................. 9-175574

(51) Int. Cl.7 .............................................. G06F 15/16
(52) U.S. Cl. ...................................................... 709/206
(58) Field of Search ................................ 709/206, 217, 709/245

(56) References Cited

U.S. PATENT DOCUMENTS 5,555,426 A * 9/1996 Johnson et al. ........ 395/200.15
5,742,769 A * 4/1998 Lee et al. .............. 395/200.36
5,761,415 A * 6/1998 Joseph et al. ............ 395/200.3

OTHER PUBLICATIONS

Quarterman et al, The E–Mail Companion: Communicating Effectively via the Internet and Other Global Networks, 1994, 132–133, 136–137 pp.*

* cited by examiner

Primary Examiner—David Davis
(74) Attorney, Agent, or Firm—Myers Bigel Sibley & Sajovec

(57) ABSTRACT

Message processing control methods, apparatus and computer programming products are provided by assembling a message including a message address portion and a body portion. Message addresses are checked to determine if any are a group address. If so, an associated list of user addresses corresponding to the members of the group is retrieved from an address book database. The retrieved list is added to the message to form a transmit message. On the receiving end of the message processing, the message address and body portions are displayed in a first window responsive to a display request. The lists of addresses may also be selected and displayed in separate, optionally scrollable, windows. Accordingly, the present invention allows ready viewing of both the message and the identity of the members of groups receiving the message.

29 Claims, 8 Drawing Sheets

FIG. 3

From: MrA2Z
To: DevGroup
Date: Wed, 25 Jun 97 09:04:31
Subject: Meeting tomorrow -Body-

FIG. 4

From: MrA2Z
To: DevGroup
Date: Wed, 25 Jun 97 09:04:31
Subject: Meeting tomorrow -Body-

| DevGroup |
|:---:|
| MrW |
| MrX |
| MrY |
| MrZ |

FIG. 5

From: MrA2Z
To: DevGroup
    Test Group
Date: Wed, 25 Jun 97 09:04:31
Subject: Meeting tomorrow -Body- From: MrA2Z
To: DevGroup
　　 Test Group
Date: Wed, 25 Jun 97 09:04:31
Subject: Meeting tomorrow -Body-

FIG. 7

From: MrA2Z
To: DevGroup
 TestGroup
cc: MrktGroup
Date: Wed, 25 Jun 97 09:04:31
Subject: Meeting tomorrow -Body-

FIG. 8

From: MrA2Z
To: DevGroup
    TestGroup
cc: MrktGroup
Date: Wed, 25 Jun 97 09:04:31
Subject: Meeting tomorrow -Body-

| DevGroup | TestGroup | MrktGroup |
|----------|-----------|-----------|
| MrW      | MrTW      | MrMW      |
| MrX      | MrTX      | MrMX      |
| MrY      | MrTY      | MrMY      |
| MrZ      | MrTZ      | MrMZ      |

METHODS, APPARATUS AND COMPUTER PROGRAM PRODUCTS FOR MESSAGE PROCESSING CONTROL INCLUDING SELECTIVE DISPLAY OF USER ADDRESSES ASSOCIATED WITH A GROUP ADDRESS

FIELD OF THE INVENTION

The present invention relates to a method for processing messages communicated over a network and, more particularly to processing such messages which are directed to a group of recipients.

BACKGROUND OF THE INVENTION

On a computer network, a mail message (hereinafter called simply "message") may be transmitted (or sent out) over the network by a computer connected to the network also known as a user agent or user. The sent out message is typically delivered to a mail transfer agent (or routing agent or server) by the user agent. Transfer information and a network topology are then determined by the mail transfer agent based on pre-set information stored at the mail transfer agent and message address information in the message which is analyzed by the mail transfer agent. By utilizing the analyzed information, a delivery path is typically determined to route the message to the desired destination mail box (or user agent). The message is typically delivered to the mail box of the address attached to the message which may be one or more mail boxes selected from a group of mail boxes available to the mail transfer agent.

When a "group address" is specified by a user, a message is typically delivered to a plurality of message addresses which are correlated to the group address in advance. For example, if the user defines a group address DevGroup as including message addresses MrW, MrX, MrY, MrZ in advance and then specifies the group address DevGroup, a message is delivered to the message addresses MrW, MrX, MrY, MrZ, respectively. However, the user receiving the message typically only is able to determine that the sender of the message is user A and the addressee is DevGroup but does not know what users are included in DevGroup as members. The party receiving the message is, therefore, unable to determine from the received message what other users received a copy of the message. Furthermore, a user receiving a message in which a plurality of group addresses are written in the header, for example, a group address DevGroup is indicated in a header component "To:" and a group address TestGroup is indicated in a header component "cc:," is generally unable to determine which of the two groups the user is a member of based on the received message.

One known method of resolving the problem of obtaining information from group address routed messages is to replace a group address written in the header component "To:" with a message address of a group member immediately before sending the message to the replaced message address. However, a problem may arise when a single group address is replaced with many message addresses, for example, 100 message addresses, as numerous (in the case of the example, 100) message addresses will exist in the header component "To:" of the received message. Accordingly, a user may be required to scroll the displayed message until the body of the message finally shows up on the screen. This may undesireably burden a user attempting to read the message. The increased scrolling will typically be expected to increase as the number of group addresses written in the header is increased.

SUMMARY OF THE INVENTION

It is, therefore, one object of the present invention to provide a computer system that can provide a message processing apparatus which allows the group members to be easily known from a received message.

It is another object of the present invention to provide a computer system that can selectively display group member information without unduly interfering with the display of the content of a received message.

These and other objects are provided by the message processing control methods, apparatus and computer programming products of the present invention.

A message is assembled including a message address portion and a body portion. Message addresses are checked to determine if any are a group address. If so, an associated list of user addresses corresponding to the members of the group is retrieved from an address book database. The retrieved list is added to the message to form a transmit message. On the receiving end of the message processing, the message address and body portions are displayed in a first window responsive to a display request. The lists of addresses may also be selected and displayed in separate, optionally scrollable, windows. Accordingly, the present invention allows ready viewing of both the message and the identity of the members of groups receiving the message.

These and other objects of the present invention are provided by methods, systems and computer program products for message processing control. According to one embodiment of the present invention a method is providing including the step of obtaining a user message including a message address. It is then determined if the message address includes a group address. If the message address includes a group address, a list of user addresses associated with the group address is retrieved. A transmit message is generated including the user message and the list of user addresses. A request to display a received message is received, wherein the received message includes a second user message including a received group address and a second list of user addresses associated with the received group address, and wherein the request to display specifies whether the second list of user addresses is to be displayed with the message. The received message is displayed. When the received request to display specifies that the second list of addresses is to be displayed the second list of user addresses is also displayed.

In a particular embodiment of the present invention, the received user message includes a header portion containing the received group address and a body portion. The received message may be the transmit message and the second list of user addresses is the list of user addresses allowing a transmit message to be viewed before transmission.

In a further embodiment of the present invention, the step of displaying the message includes displaying the second header portion and the body portion of the second user message in a first window. In this embodiment, the step of displaying the second list of user addresses includes the step of displaying the second list of user addresses in a second window if the received request to display specifies that the second list of user addresses is to be displayed. The second list of user addresses may be scrolled for display within the second window responsive to a user input.

In a further embodiment of the present invention the step of receiving a request to display a received message further includes receiving a first request and then receiving a second request corresponding to a user initiated selection of a displayed indication of the received group address in the first window so as to provide a request to display which specifies that the second list of user addresses is to be displayed. In this embodiment, the step of displaying the second header portion and the body portion of the second user message is initiated responsive to the first request and the step of displaying the second list of user addresses is initiated responsive to the second request.

In a further aspect of the present invention, the user message further includes a second message address. The message address is a group address and the second message address is a second group address. In this embodiment, the step of retrieving a list of user addresses further includes the step of retrieving an additional list of user addresses associated with the second group address. The step of generating a transmit message includes the step of generating a transmit message including the list of user addresses associated with the group address and the additional list of user addresses associated with the second group address. The received user message may include a second received group address and a third list of user addresses associated with the second received group address. The third list of user addresses may be displayed in a third window when the request to display specifies that the third list of user addresses is to be displayed.

In another aspect of the present invention a first request to display is received which initiates displaying the second header portion and the body portion in a first window. A second request is then received corresponding to a user initiated selection of a displayed indication of the received group address in the first window so as to provide a request to display which specifies that the second list of user addresses is to be displayed. The display of the second list of user addresses in a second window is initiated responsive to the second request. Finally, a third request to display is received corresponding to a user initiated selection of a displayed indication of the second received group address in the first window so as to provide a request to display which specifies that the third list of user addresses is to be displayed. The third list of user addresses is displayed in a third window responsive to the third request. The list of user addresses may be retrieved from a database in which user addresses associated with group addresses are stored.

As will further be appreciated by those of skill in the art, the present invention may be embodied as a method, apparatus or computer program product.

BRIEF DESCRIPTION OF THE DRAWINGS

FIG. 3 is an illustration of an exemplary display of a user message including a header portion and a body portion in a window according to an embodiment of the present invention.

FIG. 4 is an illustration of an exemplary display of a user message including a header portion and a body portion in a first window and a list in a second window according to an embodiment of the present invention.

FIG. 5 is an illustration of an exemplary display of a user message including a header portion and a body portion in a window in which a plurality of group addresses are included in the header portion according to an embodiment of the present invention.

FIG. 7 is an illustration of an exemplary display of a user message including a header portion and a body portion in a window in which a plurality of group addresses are included in the header portion according to an embodiment of the present invention.

FIG. 8 is an illustration of an exemplary display of a user message including a header portion and a body portion in a first window and a list in a second window and a second list in a third window and a third list in a fourth window according to an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention will now be described with respect to flow diagrams and flowcharts illustrating a system utilizing the present invention. It will be understood that each block of the flowchart and flow diagram illustrations, and combinations of blocks in the flowchart and flow diagram illustrations, can be implemented by computer program instructions. These program instructions may be provided to a processor to produce a machine, such that the instructions which execute on the processor create means for implementing the functions specified in the flowchart or flow diagram block or blocks. The computer program instructions may be executed by a processor to cause a series of operational steps to be performed by the processor to produce a computer implemented process such that the instructions which execute on the processor provide steps for implementing the functions specified in the flowchart or flow diagram block or blocks.

Accordingly, blocks of the flowchart or flow diagram illustrations support combinations of means for performing the specified functions, combinations of steps for performing the specified functions and program instruction means for performing the specified functions. It will also be understood that each block of the flowchart or flow diagram illustrations, and combinations of blocks in the flowchart or flow diagram illustrations, can be implemented by special purpose hardware-based systems which perform the specified functions or steps, or combinations of special purpose hardware and computer instructions. Accordingly, the present invention may take the form of an entirely hardware implementation, an entirely software implementation, or a combination of hardware and software.

Figure 1:
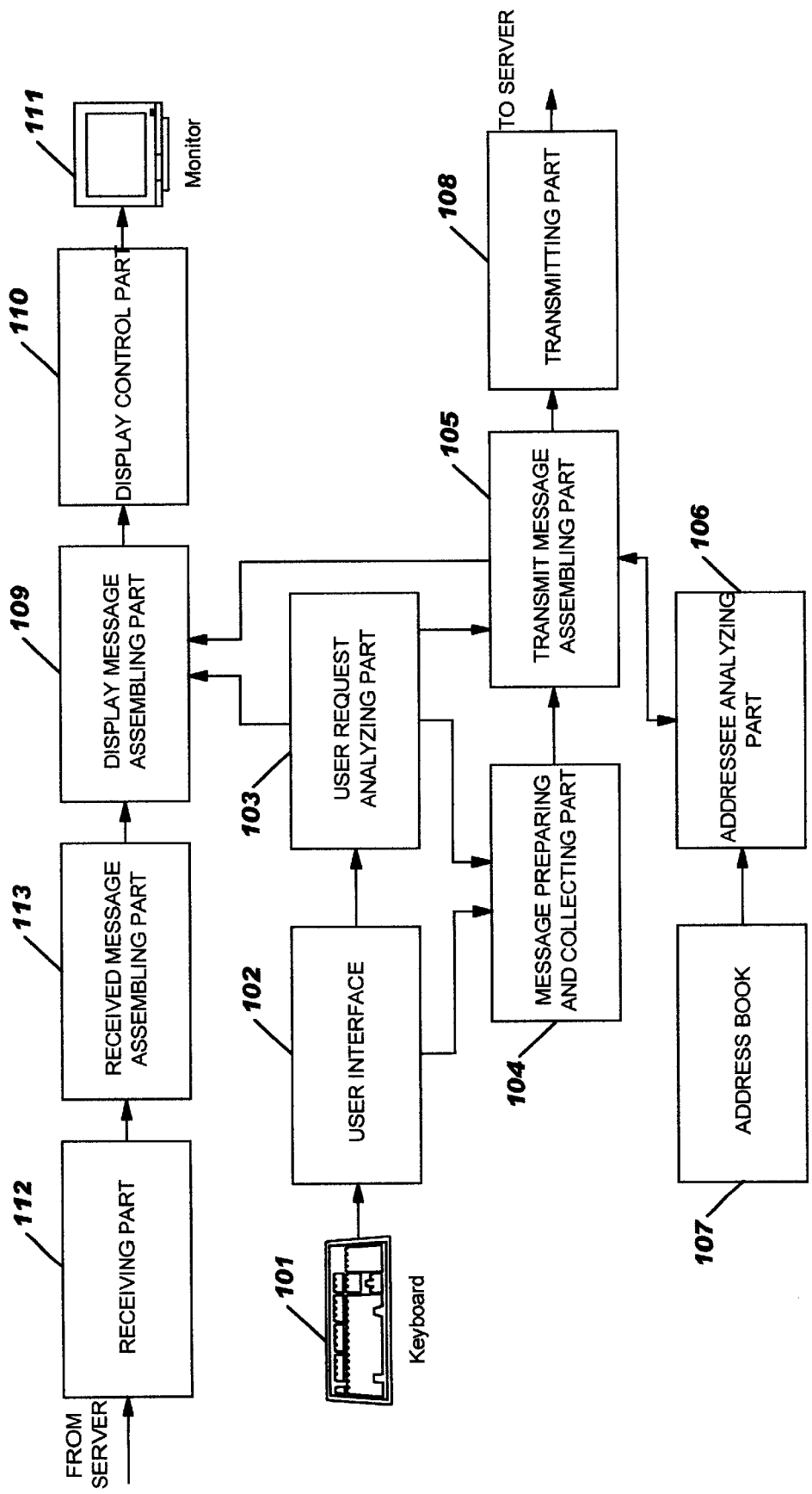
FIG. 1 is a block diagram illustrating one example hardware arrangement for a message processing control apparatus according to an embodiment of the present invention.

The preferred embodiment of the present invention will now be described while referring to the accompanying drawings. FIG. 1 is a block diagram illustrating one exemplary hardware arrangement for message processing control according to an embodiment of the present invention. As illustrated in FIG. 1, the apparatus includes an input device 101 for indicating "send message", "display transmit message", "display message received" and "display message addresses of group members", etc. The input device 101 may be, for example, a keyboard, a mouse, or the like 103. A user request analyzing part 103 for analyzing a request received from the input device 101 via a user interface 102 is also shown.

Message preparing and collecting part 104 provides a means for preparing a message in cooperation with the input device 101 and collecting a prepared message to deliver it to the transmit message assembling part 105 when a "send message" request is received from the user request analyzing part 103. Address book 107 is a database which contains data correlating the message addresses of the group members to the associated group address.

Addressee analyzing part 106 provides a means for determining whether or not there is a group address in the message addresses delivered from the transmit message assembling part 105 with reference to the address book 107. If there is no group address, addressee analyzing part 106 notifies the transmit message assembling part 105 of the absence of a group address. Otherwise, addressee analyzing part 106 retrieves user addresses of the group members associated with the group address as a list from the address book 107 for storage in a work area of the transmit message assembling part 105.

Transmit message assembling part 105 provides a means for retrieving a message address from the header of a message received by the message preparing and collecting part 104 for delivery to the addressee analyzing part 106 and assembling the header, the body and the list stored in the work area into a message for registration in a mail spool. Transmit part 108 or other means for sending a message registered by the transmit message assembling part 105 in the mail spool to a server is also provided.

Turning now to the message receiving aspects of the apparatus of FIG. 1, receiving part 112 or other means for receiving a message from a server is provided. Receive message assembling part 113 in turn provides means for re-constructing the message received by the receiving part 112 into a received message. Display message assembling part 109 or other means for assembling a display message from the header and the body of the received message and for retrieving a list from the received message is also provided. The retrieved list may be displayed by display message assembling part 109 when the request analyzed by the user request analyzing part 103 is "display message addresses of group members." Display message assembling part 109 also provides means to reconstruct a transmit message assembled by the transmit message assembling part 105 into a display message. Display control part 110 is provided for displaying the display message assembled by the display message assembling part 109 on a display part 111 such as a monitor. A list taken from a message by the display message assembling part 109 may also be displayed on the display part 111.

Figure 2:
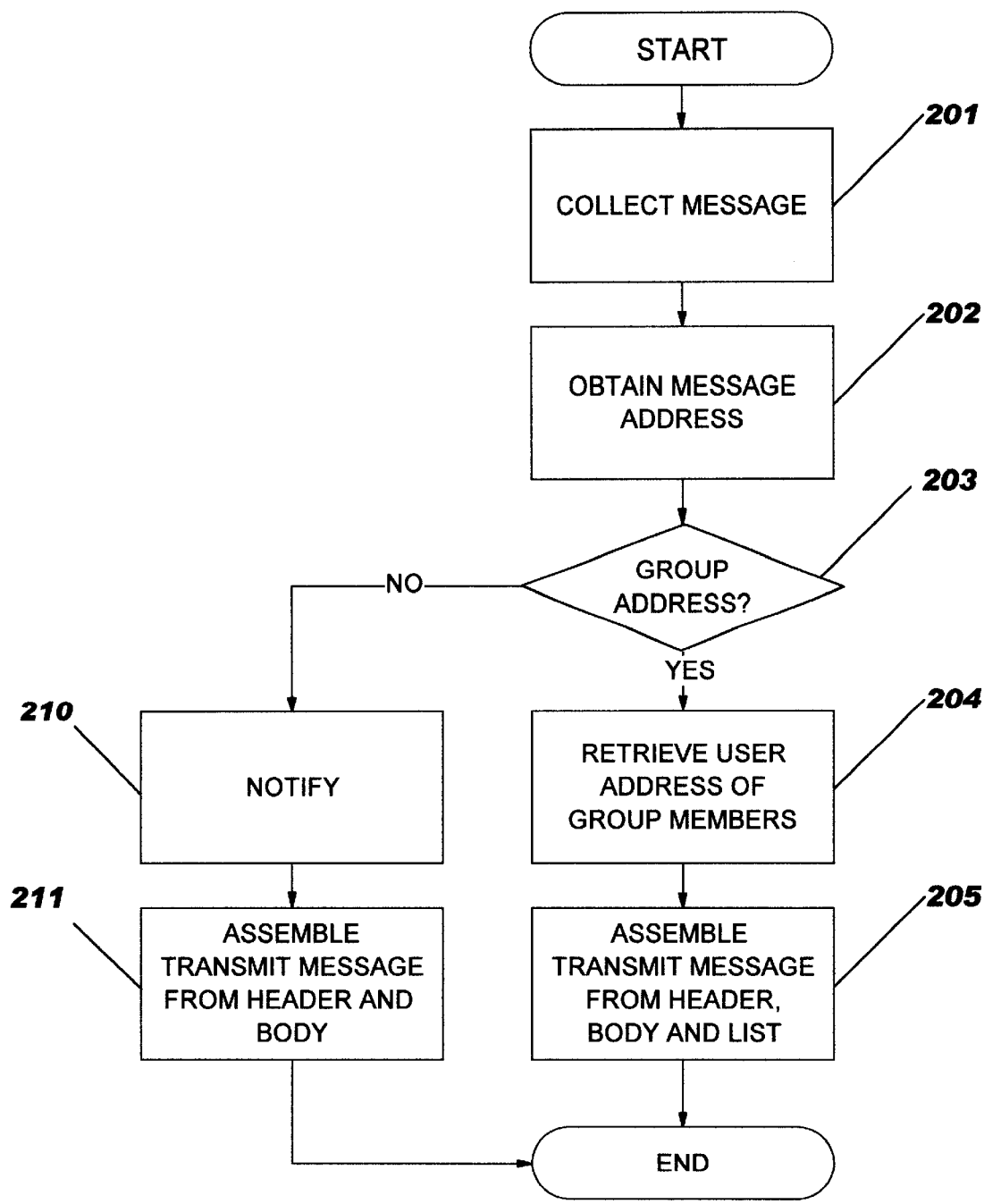
FIG. 2 is a flowchart illustrating message assembling control operations according to an embodiment of the present invention.

Operations according to an embodiment of the present invention will now be described with reference to FIG. 2. FIG. 2 is a flow chart illustrating operations for message assembling control performed by the message processing apparatus to generate a transmit message. When a user manipulates the input device 101 to request "send message", the message preparing and collecting part 104 is notified to start such processing by the user request analyzing part 103. As illustrated at block 201, the message prepared by the user is collected by the message preparing and collecting part 104 for delivery to the sending message assembling part 105.

A message address is obtained by the transmit message assembling part 105 from the header of the message delivered by the message preparing and collecting part 104 and the message address from the header is delivered to the addressee analyzing part 106 (block 202). The addressee analyzing part 106 in turn determines whether or not the received address is a group address with reference to the address book 107 (block 203). When a group address is detected, the user addresses of the group members correlated, in advance, to the group address are retrieved from the address book 107 by the addressee analyzing part 106 (block 204). The retrieved set of user addresses are correlated to the group address for temporary storage in the work area of the transmit message assembling part 105 (block 204). When an obtained message from a user contains a plurality of group addresses, a set (list) of user addresses is retrieved from the address book 107 respectively for each group address and the set of retrieved user addresses is correlated to the corresponding group address for storage in the work area of the transmit message assembling part 105. At block 205, a transmit message is assembled by the transmit message assembling part 105 from the header, the body and the list stored in the work area and sent to the server by the sending part 108.

If it is determined at block 203 that no group addresses are present, the transmit message assembling part 105 is notified accordingly (block 210). A transmit message is then assembled from the header and the body for sending to the server by the transmit part 108 (block 211).

Referring now to FIG. 1, before sending the transmit message assembled by the transmit message assembling part 105, the user may request "display transmit message" by manipulating the input device 101. When "display transmit message" is requested, the display message assembling part 109 is notified of the request by the user request analyzing part 103 and a transmit message is retrieved from the transmit message assembling part 105 by the display message assembling part 109. The transmit message taken out is re-constructed into a display message by the display message assembling part 109 and the re-constructed display message is displayed in the display part 111 by the display control part 110.

Display message assembling control operations for handling a received message according to an embodiment of the present invention will now be described. When the user requests "display received message" through the input device 101, the display message assembling part 109 is notified of the request by the user request analyzing part 103. The received message is a message which is sent from the server and received by the receiving part 112. The received message is assembled by the received message assembling part 113. Responsive to the display request, the header and the body are taken out by the display message assembling part 109 from the received message. The assembled display message is displayed in the display part 111 by the display control part 110. An example of such a display is shown in FIG. 3. A group address "DevGroup" is shown in FIG. 3.

When a user requests display of a received message along with a list of the members of the group, for example, by clicking a mouse on DevGroup, a list of user addresses associated with DevGroup is retrieved from the received message by the display message assembling part 109 and displayed in the display part 111 by the display control part 110. An example of such a resulting display is shown in FIG. 4. As shown in FIG. 4, user addresses MrW, MrX, MrY, MrZ are included in DevGroup as user addresses of the group members. These user addresses are displayed in a separate window which, in the illustrated example, is contained within a subset of the display area of the body of the message.

Referring now to FIG. 5, an example of a display of a message including a header and a body and in which multiple group addresses are included in the header component "To:" is illustrated. As shown in FIG. 5, the group addresses "DevGroup" and "TestGroup" are included. When a user clicks a mouse on DevGroup, a list of user addresses associated with DevGroup is retrieved from the message for display. When the mouse is clicked on TestGroup, a list of user addresses associated with TestGroup is retrieved for display.

Figure 6:
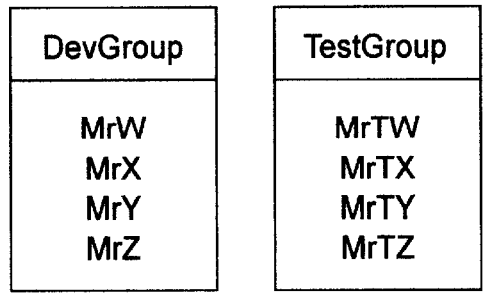
FIG. 6 is an illustration of an exemplary display of a user message including a header portion and a body portion in a first window and a list in a second window and a second list in a third window according to an embodiment of the present invention.

An example of a display including both lists is shown in FIG. 6. In the illustrated example of FIG. 6, MrW, MrX, MrY, MrZ are displayed in the DevGroup display window as user addresses of the group members for that group. Similarly, MrTW, MrTX, MrTY, MrTZ are included in the TestGroup display window as user addresses of the group members for TestGroup.

Referring now to FIG. 7, an example of a display of a message including a header and a body in which a plurality of group addresses are included in the header component "To:" and another group address is included in the header component "cc:" is illustrated. The group addresses "DevGroup," "TestGroup" and "MrktGroup" are included. As described previously, when a mouse is clicked on DevGroup and TestGroup, correlated lists of user addresses are displayed in separate windows. When the mouse is clicked on MrktGroup, a list of user addresses associated with MrktGroup is also retrieved and displayed. An example of a resulting display is illustrated in FIG. 8. As seen in FIG. 8, MrW, MrX, MrY, MrZ are included in the DevGroup window as user addresses of that group's members, MrTW, MrTX, MrTY, MrTZ are included in the TestGroup window as user addresses of that group's members and MrMW, MrMX, MrMY, MrMZ are included in the MrktGroup window as user addresses of that group's members.

A longer list of user addresses may also be accommodated according to a further aspect of the present invention. When the content of the list of user addresses is too large to include concurrently in a list display window, a scroll bar may be provided in the list display window for scrolling through the contents of the list.

Operations according to the present invention may be implemented by executing corresponding program code on a computer. They may also be implemented by having an OS (operating system) execute a part or all of actual processing according to instructions from the program code. Operations according to the present invention may also be implemented by having a CPU provided in a function expansion board or unit execute a part or all of the actual processing according to instructions from the program code after the program code is read from a computer readable recording medium and written in a memory provided with such a function expansion board inserted in the computer or such a function expansion unit connected to the computer. Various computer readable recording medium are suitable for use to supply program code according to the present invention including, for example, a floppy disk, a hard disk, MO (magneto optics), CD-ROM (compact disk read only memory), CD-R (compact disk recordable), an optical disk, a ROM (read only memory) a non-volatile memory card, or other known recording mediums.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for message processing control comprising the steps of:
   obtaining a user message including a message address;
   determining if the message address includes a group address;
   retrieving a list of user addresses associated with the group address if the message address includes the group address;
   generating a transmit message including the user message and the list of user addresses;
   receiving a request to display a received message, wherein the received message includes a second user message including a received group address and a second list of user addresses associated with the received group address, and wherein the request to display specifies whether the second list of user addresses is to be displayed with the message;
   displaying the received message; and
   displaying the second list of user addresses when the received request to display specifies that the second list of addresses is to be displayed.

2. A method according to claim 1 wherein the received message is the transmit message and the second list of user addresses is the list of user addresses.

3. A method according to claim 1 wherein the second user message includes a header portion containing the received group address and a body portion.

4. A method according to claim 3 wherein said step of displaying the message comprises the step of:
   displaying the header portion and the body portion of the second user message in a first window; and
   wherein said step of displaying the second list of user addresses comprises the step of displaying the second list of user addresses in a second window if the received request to display specifies that the second list of user addresses is to be displayed.

5. A method according to claim 4 wherein the step of displaying the second list of user addresses further comprises the step of scrolling the second list of user addresses for display within the second window responsive to a user input.

6. A method according to claim 4 wherein the step of receiving a request to display a received message further comprises the steps of:
   receiving a first request; and then
   receiving a second request corresponding to a user initiated selection of a displayed indication of the received group address in the first window so as to provide a request to display which specifies that the second list of user addresses is to be displayed; and
   wherein the step of displaying the second header portion and the body portion of the second user message is initiated responsive to the first request and the step of displaying the second list of user addresses is initiated responsive to the second request.

7. A method according to claim 4 wherein the user message further includes a second message address and wherein the message address is the group address and the second message address is a second group address and wherein the step of retrieving the list of user addresses further includes the step of retrieving an additional list of user addresses associated with the second group address and wherein the step of generating a transmit message comprises the step of generating a transmit message including the list of user addresses associated with the group address and the additional list of user addresses associated with the second group address.

8. A method according to claim 4 wherein the received user message includes a second received group address and a third list of user addresses associated with the second received group address, the method further comprising the step of displaying the third list of user addresses in a third window when the request to display specifies that the third list of user addresses is to be displayed.

9. A method according to claim 8 wherein the step of receiving a request to display a received message further comprises the steps of:

receiving a first request; and then receiving a second request corresponding to a user initiated selection of a displayed indication of the received group address in the first window so as to provide a request to display which specifies that the second list of user addresses is to be displayed;

receiving a third request corresponding to a user initiated selection of a displayed indication of the second received group address in the first window so as to provide a request to display which specifies that the third list of user addresses is to be displayed; and wherein the step of displaying the second header portion and the body portion of the second user message is initiated responsive to the first request and the step of displaying the second list of user addresses is initiated responsive to the second request and the step of displaying the third list of user addresses in a third window is initiated responsive to the third request.

10. A method according to claim 1 wherein the step of retrieving the list of user addresses includes the step of retrieving the list of user addresses from a database in which user addresses associated with group addresses, including the included group address, are stored.

11. An apparatus according to claim 10 wherein the received message is the transmit message and the second list of user addresses is the list of user addresses.

12. An apparatus according to claim 10 wherein the second user message includes a header portion containing the received group address and a body portion.

13. An apparatus according to claim 12 wherein said means for displaying the message comprises:

means for displaying the header portion and the body portion of the second user message in a first window; and wherein said means for displaying the second list of user addresses comprises means for displaying the second list of user addresses in a second window if the received request to display specifies that the second list of user addresses is to be displayed.

14. An apparatus according to claim 13 wherein the means for displaying the second list of user addresses further comprises means for scrolling the second list of user addresses for display within the second window responsive to a user input.

15. An apparatus according to claim 13 wherein the means for receiving a request to display a received message further comprises:

means for receiving a first request;

means for receiving a second request corresponding to a user initiated selection of a displayed indication of the received group address in the first window so as to provide a request to display which specifies that the second list of user addresses is to be displayed; and wherein the means for displaying the second header portion and the body portion of the second user message is responsive to the first request and the means for displaying the second list of user addresses is responsive to the second request.

16. An apparatus according to claim 13 wherein the user message further includes a second message address and wherein the message address is the group address and the second message address is a second group address and wherein the means for retrieving the list of user addresses farther includes means for retrieving an additional list of user addresses associated with the second group address and wherein the means for generating a transmit message comprises means for generating a transmit message including the list of user addresses associated with the group address and the additional list of user addresses associated with the second group address.

17. An apparatus according to claim 13 wherein the received user message includes a second received group address and a third list of user addresses associated with the second received group address, the apparatus further comprising means for displaying the third list of user addresses in a third window when the request to display specifies that the third list of user addresses is to be displayed.

18. An apparatus according to claim 17 wherein the means for receiving a request to display a received message further comprises:

means for receiving a first request; and means for receiving a second request corresponding to a user initiated selection of a displayed indication of the received group address in the first window so as to provide a request to display which specifies that the second list of user addresses is to be displayed;

means for receiving a third request corresponding to a user initiated selection of a displayed indication of the second received group address in the first window so as to provide a request to display which specifies that the third list of user addresses is to be displayed; and wherein the means for displaying the second header portion and the body portion of the second user message is responsive to the first request and the means for displaying the second list of user addresses is responsive to the second request and the means for displaying the third list of user addresses in a third window is responsive to the third request.

19. A computer program product for message processing control, comprising:

a computer readable storage medium having computer-readable program code means embodied in said medium, said computer-readable program code means comprising:

computer-readable program code that obtains a user message including a message address;

computer-readable program code that determines if the message address includes the group address;

computer-readable program code that retrieves a list of user addresses associated with the group address if the message address includes a group address;

computer-readable program code that generates a transmit message including the user message and the list of user addresses;

computer-readable program code that receives a request to display a received message, wherein the received message includes a second user message including a received group address and a second list of user addresses associated with the received group address, and wherein the request to display specifies whether the second list of user addresses is to be displayed with the message;

computer-readable program code that displays the received message; and computer-readable program code that displays the second list of user addresses when the received request to display specifies that the second list of addresses is to be displayed.

20. A computer program product according to claim 19 wherein the received message is the transmit message and the second list of user addresses is the list of user addresses.

21. A computer program product according to claim 19 wherein the second user message includes a header portion containing the received group address and a body portion.

22. A computer program product according to claim 21 wherein said computer-readable program code that displays the message comprises:

computer-readable program code that displays the header portion and the body portion of the second user message in a first window; and wherein said computer-readable program code that displays the second list of user addresses comprises computer-readable program code that displays the second list of user addresses in a second window if the received request to display specifies that the second list of user addresses is to be displayed.

23. A computer program product according to claim 22 wherein the computer-readable program code that displays the second list of user addresses further comprises computer-readable program code that scrolls the second list of user addresses for display within the second window responsive to a user input.

24. A computer program product according to claim 22 wherein the computer-readable program code that receives a request to display a received message further comprises:

computer-readable program code that receives a first request;

computer-readable program code that receives a second request corresponding to a user initiated selection of a displayed indication of the received group address in the first window so as to provide a request to display which specifies that the second list of user addresses is to be displayed; and wherein the computer-readable program code that displays the second header portion and the body portion of the second user message is responsive to the first request and the computer-readable program code that displays the second list of user addresses is responsive to the second request.

25. A computer program product according to claim 22 wherein the user message further includes a second message address and wherein the message address is the group address and the second message address is a second group address and wherein the computer-readable program code that retrieves the list of user addresses further includes computer-readable program code that retrieves an additional list of user addresses associated with the second group address and wherein the computer-readable program code that generates a transmit message comprises computer-readable program code that generates a transmit message including the list of user addresses associated with the group address and the additional list of user addresses associated with the second group address.

26. A computer program product according to claim 22 wherein the received user message includes a second received group address and a third list of user addresses associated with the second received group address, the apparatus further comprising computer-readable program code that displays the third list of user addresses in a third window when the request to display specifies that the third list of user addresses is to be displayed.

27. A computer program product according to claim 26 wherein the computer-readable program code that receives a request to display a received message further comprises:

computer-readable program code that receives a first request; and computer-readable program code that receives a second request corresponding to a user initiated selection of a displayed indication of the received group address in the first window so as to provide a request to display which specifies that the second list of user addresses is to be displayed;

computer-readable program code that receives a third request corresponding to a user initiated selection of a displayed indication of the second received group address in the first window so as to provide a request to display which specifies that the third list of user addresses is to be displayed; and wherein the computer-readable program code that displays the second header portion and the body portion of the second user message is responsive to the first request and the computer-readable program code that displays the second list of user addresses is responsive to the second request and the computer-readable program code that displays the third list of user addresses in a third window is responsive to the third request.

28. An apparatus for message processing control comprising:

means for obtaining a user message including a message address;

means for determining if the message address includes a group address;

means for retrieving a list of user addresses associated with the group address if the message address includes the group address;

means for generating a transmit message including the user message and the list of user addresses;

means for receiving a request to display a received message, wherein the received message includes a second user message including a received group address and a second list of user addresses associated with the received group address, and wherein the request to display specifies whether the second list of user addresses is to be displayed with the message;

means for displaying the received message; and means for displaying the second list of user addresses when the received request to display specifies that the second list of addresses is to be displayed.

29. An apparatus for message processing control comprising:

a user interface that obtains a user message including a message address;

an address analyzing part that determines if the message address includes a group address and retrieves a list of user addresses associated with the group address if the message address includes the group address;

a transmit message assembling part that generates a transmit message including the user message and the list of user addresses;

a user request analyzing part that receives a request to display a received message, wherein the received message includes a second user message including a received group address and a second list of user addresses associated with the received group address, and wherein the request to display specifies whether the second list of user addresses is to be displayed with the message; and a display message assembling part that displays the received message on a display and displays the second list of user addresses on the display if the received request to display specifies that the second list of addresses is to be displayed.

* * * * *